United States Patent
Mills et al.

(10) Patent No.: US 9,423,045 B2
(45) Date of Patent: Aug. 23, 2016

(54) METHOD FOR SOLENOID MOTOR VENTING WITH CONTAMINATION PROTECTION VIA A HYDRAULIC SLEEVE

(71) Applicant: BorgWarner Inc., Auburn Hills, MI (US)

(72) Inventors: David C. Mills, Lake Orion, MI (US); Garrett R. Holmes, Ortonville, MI (US); Scott M. Weber, Farmington Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 60 days.

(21) Appl. No.: 14/408,044

(22) PCT Filed: Jun. 13, 2013

(86) PCT No.: PCT/US2013/045609
§ 371 (c)(1),
(2) Date: Dec. 15, 2014

(87) PCT Pub. No.: WO2013/192003
PCT Pub. Date: Dec. 27, 2013

(65) Prior Publication Data
US 2015/0144820 A1 May 28, 2015

Related U.S. Application Data

(60) Provisional application No. 61/662,679, filed on Jun. 21, 2012.

(51) Int. Cl.
*F16K 31/06* (2006.01)
*H01F 7/16* (2006.01)
(Continued)

(52) U.S. Cl.
CPC ........ *F16K 31/0613* (2013.01); *F16H 61/0009* (2013.01); *F16H 61/0251* (2013.01); *F16H 61/143* (2013.01); *F16K 3/32* (2013.01); *F16K 11/0716* (2013.01); *F16K 27/041* (2013.01); *F16K 27/048* (2013.01); *H01F 7/128* (2013.01); *H01F 7/16* (2013.01); *H01F 7/1607* (2013.01);
(Continued)

(58) Field of Classification Search
CPC . F16K 27/029; F16K 27/048; F16K 31/0624; F16K 31/0655; F16K 31/0675; F16K 31/02; F16K 31/0603; F16K 31/061; F16K 31/0613; F16K 31/0627; H01F 2007/086; H01F 3/00; H01F 41/02; H01F 7/1653; H01F 7/128
USPC ...................... 251/129.15; 335/278, 279, 281
See application file for complete search history.

(56) References Cited

U.S. PATENT DOCUMENTS 3,103,612 A 9/1963 Marmo
3,324,889 A 6/1967 Batts
(Continued)

OTHER PUBLICATIONS

International Search Report and Written Opinion for International Application No. PCT/US2013/045609, dated Sep. 4, 2013.
(Continued)

*Primary Examiner* — Matthew W Jellett
(74) *Attorney, Agent, or Firm* — Warn Partners, P.C.

(57) ABSTRACT

A solenoid valve is provided having a hydraulic body with an undulated expansion artery to prevent an exchange of fluid between an interior of the hydraulic body and the exterior of the solenoid valve.

20 Claims, 2 Drawing Sheets

(51) Int. Cl.

| | | |
|---|---|---|
| *F16H 61/00* | (2006.01) | |
| *H01F 7/128* | (2006.01) | |
| *F16K 27/04* | (2006.01) | |
| *F16H 61/14* | (2006.01) | |
| *F16K 3/32* | (2006.01) | |
| *F16K 11/07* | (2006.01) | |
| *H01F 7/08* | (2006.01) | |
| *F16H 61/02* | (2006.01) | |

(52) U.S. Cl.
CPC ... *F16H 2061/0253* (2013.01); *H01F 2007/085* (2013.01)

(56) References Cited

U.S. PATENT DOCUMENTS

| | | | |
|---|---|---|---|
| 3,805,203 A | 4/1974 | Deckard | |
| 4,250,922 A | 2/1981 | Will et al. | |
| 4,251,051 A | 2/1981 | Quenneville et al. | |
| 4,382,241 A | 5/1983 | Hehl | |
| 4,390,158 A | 6/1983 | Lang | |
| 4,509,716 A | 4/1985 | Barber et al. | |
| 4,639,704 A | 1/1987 | Shand et al. | |
| 4,662,605 A | 5/1987 | Garcia | |
| 4,932,439 A | 6/1990 | McAuliffe, Jr. | |
| 4,947,893 A | 8/1990 | Miller et al. | |
| 4,966,195 A | 10/1990 | McCabe | |
| 5,067,524 A | 11/1991 | Pickenhahn | |
| 5,076,323 A | 12/1991 | Schudt | |
| 5,102,095 A | 4/1992 | Schmitt-Matzen et al. | |
| 5,197,507 A | 3/1993 | Miki et al. | |
| 5,259,414 A | 11/1993 | Suzuki | |
| 5,284,317 A | 2/1994 | Brehm et al. | |
| 5,503,364 A | 4/1996 | Enomoto et al. | |
| 5,513,673 A | 5/1996 | Slavin et al. | |
| 5,513,832 A | 5/1996 | Becker et al. | |
| 5,547,165 A | 8/1996 | Brehm et al. | |
| 5,606,992 A | 3/1997 | Erickson et al. | |
| 5,709,342 A | 1/1998 | McCauley | |
| 5,848,613 A | 12/1998 | Sakaguchi et al. | |
| 5,853,028 A | 12/1998 | Ness et al. | |
| 5,879,060 A | 3/1999 | Megerle et al. | |
| 5,915,416 A | 6/1999 | Okazaki et al. | |
| 5,984,259 A | 11/1999 | Najmolhoda et al. | |
| 6,062,536 A | 5/2000 | Bircann | |
| 6,065,734 A | 5/2000 | Tackett et al. | |
| 6,220,275 B1 | 4/2001 | Nishinosono et al. | |
| 6,397,891 B1 | 6/2002 | Neuhaus et al. | |
| 6,420,950 B1 | 7/2002 | Kleinert et al. | |
| 6,538,543 B2 | 3/2003 | Bircann et al. | |
| 6,601,822 B2* | 8/2003 | Tachibana | F16K 31/0613 137/625.69 |
| 6,619,615 B1 | 9/2003 | Mayr et al. | |
| 6,778,049 B1 | 8/2004 | Alyanak | |
| 6,877,717 B2* | 4/2005 | Collins | B60T 8/363 251/129.15 |
| 7,468,647 B2* | 12/2008 | Ishibashi | F16K 31/0613 251/129.15 |
| 7,474,948 B2 | 1/2009 | Sandstrom | |
| 8,109,487 B2* | 2/2012 | Kokubu | F16K 31/0613 251/129.15 |
| 8,154,370 B2* | 4/2012 | Ishibashi | H01F 7/081 251/129.15 |
| 8,757,587 B2* | 6/2014 | Miura | F16K 31/06 251/129.15 |
| 2011/0303861 A1 | 12/2011 | Jones | |
| 2015/0179322 A1* | 6/2015 | Irie | H01F 3/00 335/281 |

OTHER PUBLICATIONS

PCT Patent Application No. PCT/US2010/021924, filed Jan. 25, 2010, Applicant: BorgWarner, Inc.

* cited by examiner

METHOD FOR SOLENOID MOTOR VENTING WITH CONTAMINATION PROTECTION VIA A HYDRAULIC SLEEVE

This application is a National Stage of International Application No. PCT/US2013/045609, filed Jun. 13, 2013. This application claims priority to U.S. Provisional Patent Application No. 61/662,679 filed on Jun. 21, 2012. The disclosures of the above applications are incorporated herein by reference.

FIELD OF THE INVENTION

The present invention relates to solenoid valves, especially solenoid valves utilized in the control of hydraulic control fluids and such valves that can function submerged in hydraulic fluid.

BACKGROUND OF THE INVENTION

Automotive automatic transmissions typically have a plurality of components including torque convertors and clutches wherein states of engagement and disengagement must be controlled. Initially such components were controlled with fluid pressure logic components. In an era approximately beginning in the 1980's, more and more automotive transmissions have been brought forth wherein the control of the torque convertor and clutches has been taken over by electronic logic controls which utilize solenoid valves (sometimes referred to as linear action electromagnetic motor actuated valves) to control the hydraulic control fluid which actuates or relieves the operation of the various fluid pressure actuated components of the transmission. Currently, many of these solenoid valves are installed within the transmission fluid.

Most solenoid valves utilized in vehicle automotive transmissions have a coil wrapped in a non-magnetic bobbin. Encasing the coil and providing a portion of the magnetic loop of the solenoid valve is a casing. On an interior diameter of the bobbin is typically a flux tube and a pole piece. Slidably mounted inside the flux tube and pole piece is an armature which contacts a valve member. To align the flux tube and pole piece and to maintain a close axial separation between the flux tube and pole piece, there is provided a non-magnetic material alignment tube. An example of such a solenoid valve can be found by a review of PCT Patent Application No. PCT/US2010/021924.

Due to manufacturing variations, the current/force operation of individual solenoid valves can vary slightly. To achieve the optimum performance in a transmission, it is desirable that the solenoid valves be calibrated. Previously, calibration was done mechanically, but it has been found preferable that calibration of the solenoid valves be achieved utilizing a software methodology as revealed in U.S. Pat. No. 7,474,948. When the solenoids are calibrated electronically, it is desirable that the operation of the solenoids be consistant over the lifetime of its operation within the transmission as much as possible. As previously mentioned, solenoids in automotive transmissions are often submerged within the transmission fluid. During operation of the vehicle and due to wear of the various gears, shafts and bearings of the transmission, metallic particles are generated as contaminants in the transmission fluid. These contaminants can often become lodged within the solenoid valves since they are attracted to the magnetic fields which permeate the solenoid valves. As mentioned previously, most solenoid valves have a casing and a separate flux tube and pole piece. Where there are interfaces between the various components, over process of time, metallic components can become lodged within the interfaces between the various components. When metallic components become lodged within the interface of the various components, the flux efficiency or density of the various components can be modified thereby changing the operation of the solenoid valve away from its initial calibrated setting. It is desirable to provide a solenoid valve which especially in submerged environments will have a more constant operation over time regardless of the presence of metallic contaminants from the hydraulic fluid that the solenoid valve is submerged within.

To inhibit the ingestion into the interior of the solenoid of metallic contaminants, solenoid valves have been provided with extended vent paths. Prior vent path designs have suffered from the fact that typically they are generated from curvilinear and linear segments. Additionally, in some instances, the designs have taken away critical spacing adjacent to the coil bobbin assembly of the solenoid valve which is undesirable. Additionally, at least one configuration has generated paths on the spool itself which provides very thin sealing widths as compared with a width of the path, subjecting the path to possible cross leakage. It is desirable to provide a solenoid valve with measures to minimize or eliminate the ingestion of contaminates without the aforementioned disadvantages of prior solenoid valve designs.

SUMMARY OF THE INVENTION

To make manifest the above noted and other desires, a revelation of the present invention is brought forth. In a preferred embodiment of the present invention, a solenoid valve is provided which has an expansion artery which is provided in the hydraulic valve body. Accordingly, architectural space for the coil bobbin area of the solenoid valve need not be compromised and sealing width can be greatly enhanced. Additionally undulations are provided in the expansion artery to further inhibit fluid exchange which may lead to the ingestion of metallic contaminants into the interior of the solenoid valve.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
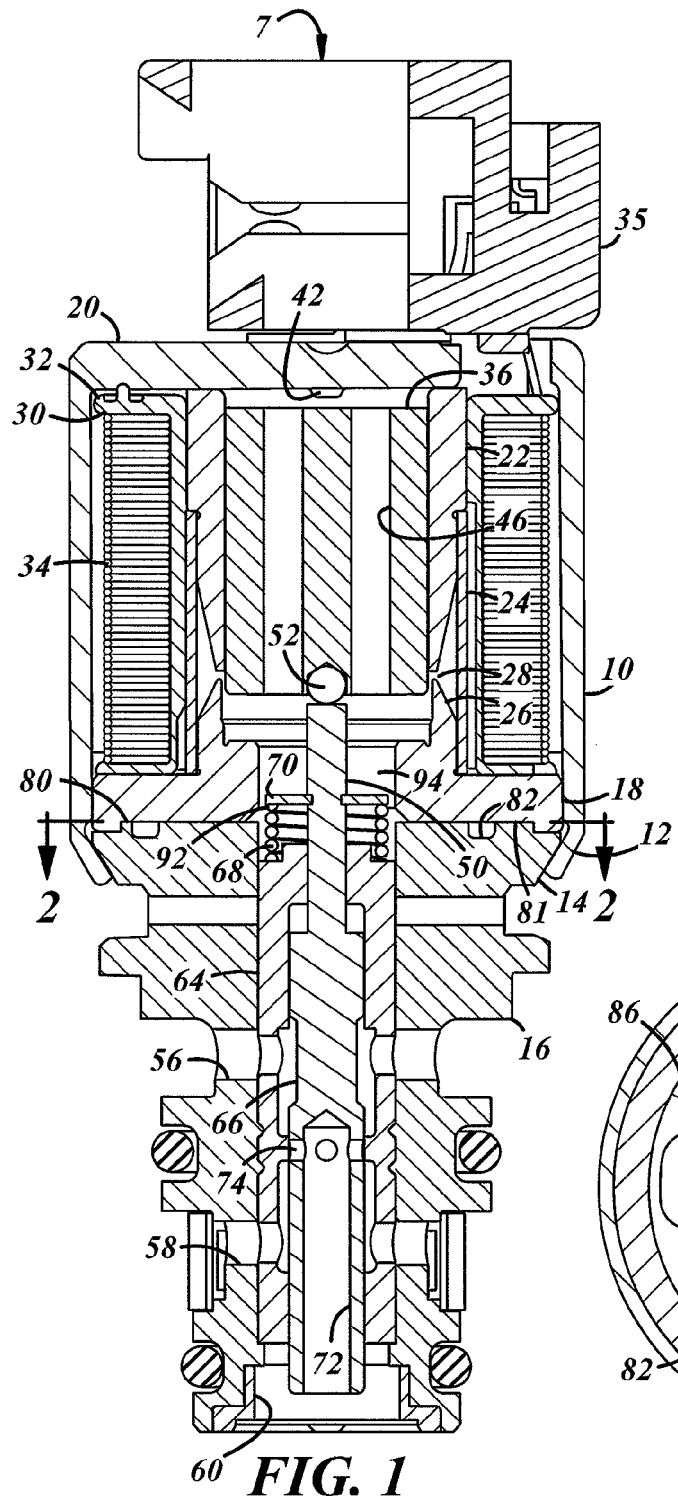
FIG. 1 is a sectional view of another normally low control pressure solenoid valve of the present invention.
Figure 2:
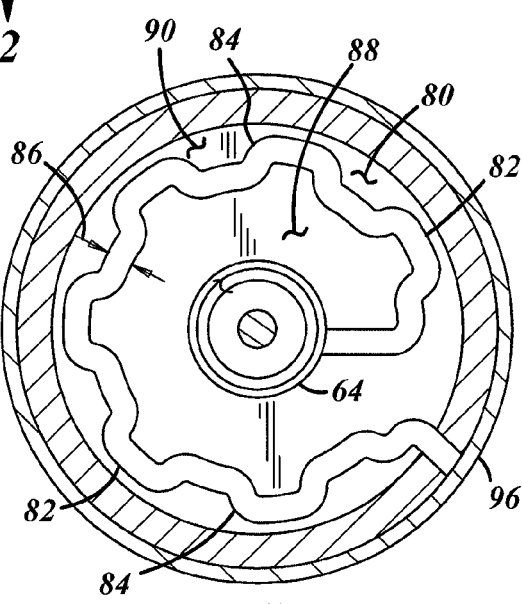
FIG. 2 is a sectional view taken along line 2-2 of FIG. 1.

Referring to FIGS. 1 and 2, an immersible solenoid valve 7 according to the present invention can have a ferromagnetic casing 10. The casing 10 along its lower end has a series of slots (not shown) to aid in their bending over of tabs 12 which contact an inclined portion 14 of a hydraulic body 16 to capture the same to the casing 10 and to a flux washer 18. The casing 10 is generally open along its lower end and is closed on its top end 20. The casing 10 forms a generally tubular envelope. The casing 10 may be machined, deep drawn or forged. Positioned within the casing and extending generally axially therein is a first ferromagnetic annular member commonly referred to as a flux tube 22. The flux tube 22 is radially aligned by a non-magnetic alignment tube 24 with a second ferromagnetic annular magnetic member commonly referred to as a pole piece 26. The pole piece 26 is magnetically connected with the casing by the flux washer 18. In other embodiments (not shown) the pole piece 26 may be separate from the flux washer 18 even though it is magnetically connected with the casing 10 via the flux washer 18. Axially magnetically separating the flux tube 22 from the pole piece 26 is a gap 28. In other embodiments to be described, the flux tube and pole piece can be formed from a single member having a thin section there between often referred to as a flux choke. Radially juxtaposing the flux tube 22 and pole piece 26 from the casing 10 is a coil and bobbin assembly 30. The coil and bobbin assembly includes a non-magnetic typically polymeric bobbin 32 which is wrapped typically in a copper coil bundle 34. The coil 34 is electrically actuated to activate movement of a ferromagnetic armature 36. An electrical connector 35 is provided to provide current to the coil 34

The ferromagnetic armature 36 is slidably mounted within the flux tube 22 and the pole piece 26. The top end 20 of the casing has extending internally downward there from a dimple 42 to aid in the prevention of magnetic latching of the armature 36 with the casing 10. The armature 36 or alternatively the flux tube 22 and pole piece 26 may have a thin lining of non-magnetic material such as nickel or other non-magnetic compounds to aid in the prevention of side latching. The armature 36 also has a series of axial passages 46 to allow fluid within the solenoid valve 7 to move between axial sides of the armature 36. The armature 36 imparts movement to a valve member 50 via a ball 52 connected with the armature 36.

The hydraulic body 16 has an exhaust inlet/outlet passage provided by a cross bore 56. A cross-bore 58 is connected with the supply pressure. An axial bore 60 is connected with control pressure. As shown, solenoid 7 is a normally low control pressure solenoid valve. Hydraulic body 16 is a polymeric member having a metallic inner liner or sleeve 64. Slidably mounted within the sleeve is the valve member 50 having a spool portion 66. The spool portion 66 is spring biased by a spring 68 which engages a washer 70. The spool 66 has an internal passage 72 which is connected with the control pressure which intersects a series of cross bores 74. Cross bores 74 are typically positioned wherein they fluidly communicate with cross bore 56 bringing control pressure in communication with exhaust. To cause control pressure to be connected with supply pressure, coil 34 is actuated causing the armature 36 to move against the biasing of spring 68 causing cross bores 74 to be brought in fluid communication with the hydraulic body cross bore 58 which is connected with fluid supply to increase the hydraulic pressure in the system. The activation of the coils 34 generating a flux loop in the flux washer casing and flux tube. Due to the gap 28, the flux loop will skip into the armature 36 and then exit out through the armature to the pole piece 26 causing the armature 36 to reach a point of least reluctance thereby causing the armature 36 to move downward.

The hydraulic body 16 has an engagement surface 80 with the flux washer 18. The hydraulic body 16 is positioned adjacent a sealing surface 81 of a sealing member provided by the flux washer 18. Engagement surface 80 has a spiral like expansion artery 82 having a series of undulations 84. A transverse width 86 of the expansion artery is typically no greater than twice of a width of the lateral sealing surfaces 88, 90 of the expansion artery. In many applications, the width 86 of the expansion artery will be less than a width of the lateral sealing surfaces. The expansion artery 82 connects an interior 94 of the hydraulic body and flux washer with an exterior periphery 96 of the solenoid valve. Typically the expansion artery 82 is formed at its extreme end by a flat section of the inclined portion 14 of the hydraulic body as it engages with the crimped tab 12 of the casing 10.

The volume of the expansion artery 82 is preferably at least three times a pumping volume displaced by the armature 36 and the valve member 50 between its axial extreme positions. In calculating the pumping volume, the armature 36 is ignored due to axial passage 46.

Due to the many undulations 84 of the expansion artery 82, fluid exchange is minimized due to the additional length as well as the difficulty of the fluid successfully making the turns thereby reducing if not totally eliminating an exchange of fluid external with the solenoid to the fluid which is within the interior of the flux washer 18 (commonly referred to as the pumping chamber). In the embodiment of Applicants' invention wherein the hydraulic body is fabricated from a polymeric material, metallic particles which may be within the lubricant will have a tendency to stick to adhere to the flux washer 18 rather than travel the full length of the expansion artery. Due to the wideness of the sealing surfaces 88 and 90, cross-contamination is prevented during pressure pulsations which would cause lubricant to escape the expansion artery. A further advantage of Applicants' invention is that the total expansion artery is positioned away from the coil spool assembly 30 therefore allowing the coil and bobbin assembly 30 to have a maximum axial and radial dimension for a given solenoid within a fixed casing size. This is critical in providing a powerful solenoid valve while at the same time keeping activation current small and providing the solenoid valve with as small architecture as possible.

Figure 3:
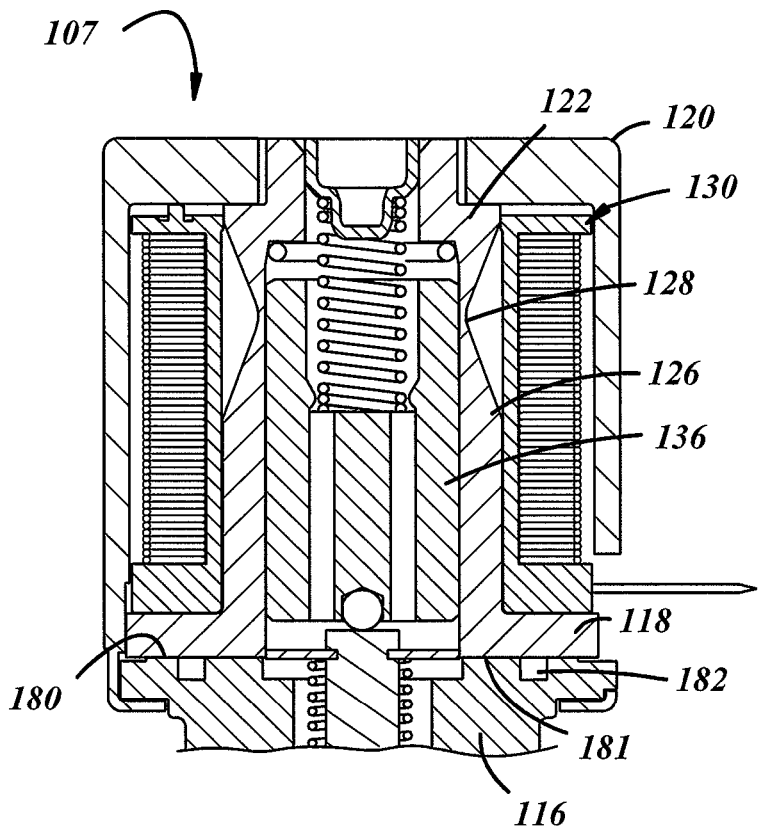
FIG. 3 is a sectional view similar to that of FIG. 1 of an alternate preferred embodiment normally high solenoid valve according to the present invention.

Referring to FIG. 3, a cross-section of an alternate preferred embodiment normally high solenoid valve 107 is provided. Solenoid valve 107 has an outer casing 120 in a coil bobbin assembly 130. The coil bobbin assembly 130 encircles a first ferromagnetic annular member 122. The first annular ferromagnetic member 122 is magnetically separated from an integral second ferromagnetic member 126 by a flux choke 128. Since the ferromagnetic annular members 122 and 126 are joined together, there is no need for an alignment tube. The second ferromagnetic member 126 is integral with a flux washer 118 which has an underside sealing surface 181. The sealing surface 181 is adjacent an engagement surface 180 provided by a hydraulic body 116. Hydraulic body 116 has an expansion artery 182 similar to that of afore-described expansion artery 81 of solenoid 7 of FIGS. 1 and 2.

Figure 4:
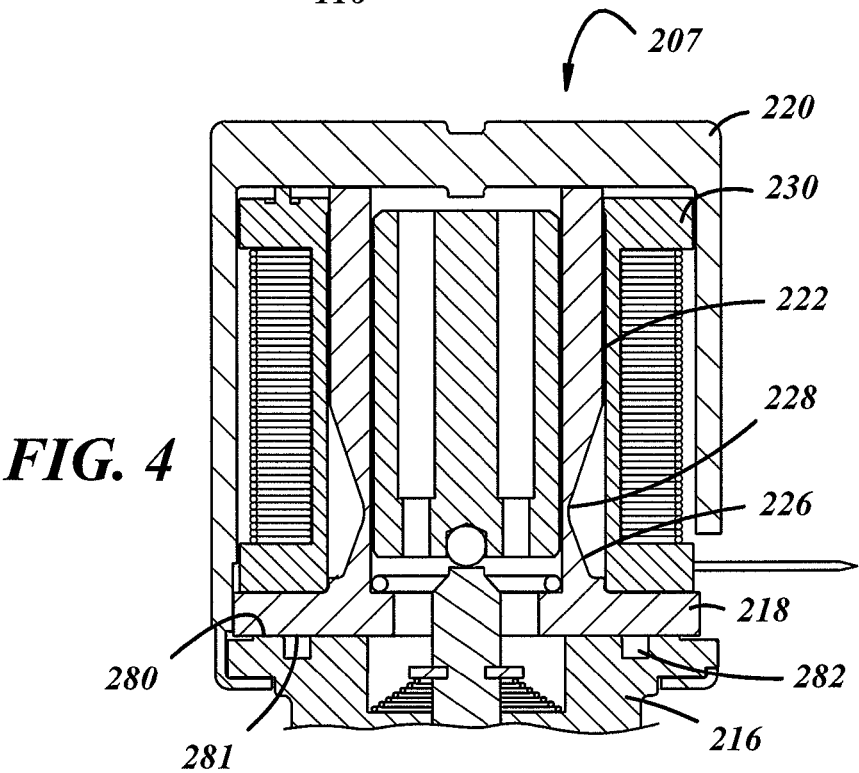
FIG. 4 is a sectional view of another alternate preferred embodiment solenoid valve of the present invention which is a normally low solenoid valve.

FIG. 4 provides a solenoid 207 similar to solenoid 107, but being a normally low solenoid having an outer casing 220 with a coil and bobbin assembly 230 encasing an upper annular ferromagnetic member 222 separated by a flux choke 228 from a second annular ferromagnetic member 226 which is in turn integrally connected with a flux washer 218. Flux washer 218 provides a sealing surface 281 in contact with a contact surface 280 of a hydraulic body 216 having an expansion artery 282.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An immersible solenoid valve comprising:
   an electromagnetic motor including an armature slideably mounted within said electromagnetic motor providing movement in a linear fashion;
   a sealing member providing a generally flat sealing surface;
   a valve member moved as a result of movement of said armature; and
   a hydraulic body encompassing said valve member positioned adjacent said sealing member sealing surface, said hydraulic body having an engagement surface engaged with said flat sealing surface of said sealing member, and wherein said engagement surface has a spiral like undulated expansion artery connecting an interior of said hydraulic body with a peripheral exterior of said solenoid valve, said expansion artery having lateral sealing surfaces having a width at least as great as a half the transverse width of said expansion artery.

2. An immersible solenoid valve comprising: a ferromagnetic casing; a first annular ferromagnetic member magnetically connected with said casing; a second ferromagnetic member magnetically connected with said casing and axially separated from said first annular magnetic member by a flux choke; a coil radially juxtaposing said first and second annular ferromagnetic members and said casing; an armature moved by said coil slidably mounted for movement within said first and second annular ferromagnetic members; a sealing member providing a generally flat sealing surface; a valve member moved as a result of movement of said armature; and a hydraulic body encompassing said valve member positioned adjacent said sealing member sealing surface, said hydraulic body having an engagement surface engaged with said sealing member sealing surface, and wherein said engagement surface has a spiral like undulated expansion artery connecting an interior of said hydraulic body with a peripheral exterior of said solenoid valve, said expansion artery having lateral sealing surfaces having a width at least one half as great as a transverse width of said expansion artery.

3. An immersible solenoid valve comprising:
   a ferromagnetic casing;
   a ferromagnetic flux tube magnetically connected with said casing;
   a ferromagnetic annular pole piece axially separated from said flux tube by a gap;
   a flux washer magnetically connecting said pole piece with said casing and being integrally connected with said pole piece;
   a coil wrapped in a bobbin radially juxtaposing said flux tube and pole piece from said casing;
   an armature moved by said coil slidably mounted for movement within said flux tube and said pole piece;
   a spool valve moved by said armature;
   a polymeric hydraulic body encompassing said hydraulic body being connected with said flux washer by being connected to said flux washer by said casing, said hydraulic body having an engagement surface engaging said flux washer, and wherein said engagement surface has a spiral like undulated expansion artery connecting an interior of said flux washer with a peripheral exterior of said solenoid valve, said expansion artery having lateral sealing surface having a width at least as a transverse width of said expansion artery.

4. The solenoid valve of claim 1 wherein a volume of said expansion artery is at least three times larger than a pumping volume of said armature and valve member at stroke extremes.

5. The solenoid valve of claim 1 wherein said valve member is a spool valve.

6. The solenoid valve as of claim 2 wherein said casing is crimped to join said hydraulic body with said flux washer.

7. The solenoid valve of claim 1 wherein said hydraulic body has a sleeve surrounding said valve member.

8. The solenoid valve of claim 1 wherein said hydraulic body engagement surface is provided by a polymeric material.

9. The solenoid valve of claim 1 wherein said valve member is spring biased.

10. The solenoid valve of claim 2 wherein said expansion artery extreme end is formed between a radial periphery of the hydraulic body and said casing.

11. The solenoid valve of claim 2 wherein the first annular ferromagnetic member and the second annular ferromagnetic member are formed as a single piece separated by a flux choke.

12. The solenoid valve of claim 1 wherein the solenoid valve is a normally high solenoid valve.

13. The solenoid valve of claim 1 wherein the solenoid valve is a normally low solenoid valve.

14. The solenoid valve of claim 1 wherein the width of the lateral sealing surfaces is as great as the width of the expansion artery.

15. The solenoid valve of claim 2 wherein a volume of said expansion artery is at least three times larger than a pumping volume of said armature and valve member at stroke extremes.

16. The solenoid valve of claim 3 wherein a volume of said expansion artery is at least three times larger than a pumping volume of said armature and valve member at stroke extremes.

17. The solenoid valve of claim 2 wherein said hydraulic body engagement surface is provided by a polymeric material.

18. The solenoid valve of claim 2 wherein said valve member is a spool valve.

19. The solenoid valve of claim 2 wherein said valve member is spring biased.

20. The solenoid valve of claim 3 wherein said valve member is spring biased.

* * * * *